(12) United States Patent
Yonezawa et al.

(10) Patent No.: US 11,077,887 B2
(45) Date of Patent: Aug. 3, 2021

(54) MONOCOQUE VEHICLE STRUCTURE

(71) Applicant: Toyota Jidosha Kabushiki Kaisha, Toyota (JP)

(72) Inventors: Seiho Yonezawa, Toyota (JP); Hiroki Hyodo, Toyota (JP); Tetsuya Oda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 47 days.

(21) Appl. No.: 16/751,881

(22) Filed: Jan. 24, 2020

(65) Prior Publication Data

US 2020/0247480 A1 Aug. 6, 2020

(30) Foreign Application Priority Data

Feb. 1, 2019 (JP) .............................. JP2019-017221

(51) Int. Cl.
*B62D 29/00* (2006.01)
*B62D 29/04* (2006.01)
*B60K 5/12* (2006.01)

(52) U.S. Cl.
CPC .............. *B62D 29/046* (2013.01); *B60K 5/12* (2013.01)

(58) Field of Classification Search
CPC ......... B62D 29/046; B62D 29/04; B60K 5/12
See application file for complete search history.

(56) References Cited

U.S. PATENT DOCUMENTS

| 9,381,954 | B2 * | 7/2016 | Werum | B62D 29/046 |
| 10,960,929 | B2 * | 3/2021 | Czinger | B62D 27/023 |
| 2004/0232725 | A1 | 11/2004 | Marelja | |
| 2012/0048638 | A1 * | 3/2012 | Kim | B60K 5/1241 180/292 |
| 2012/0118660 | A1 * | 5/2012 | Tamura | F16F 13/103 180/312 |
| 2014/0300138 | A1 * | 10/2014 | Gonda | B62D 25/2027 296/187.12 |
| 2015/0048652 | A1 | 2/2015 | Maeda et al. | |
| 2016/0137229 | A1 * | 5/2016 | Nishida | B62D 23/00 296/181.2 |
| 2018/0186411 | A1 * | 7/2018 | Ast | B62D 25/2027 |

FOREIGN PATENT DOCUMENTS

| EP | 2786918 A1 | 10/2014 |
| JP | 2004-262443 A | 9/2004 |
| WO | 2013128619 A1 | 9/2013 |

* cited by examiner

*Primary Examiner* — Lori L Lyjak
(74) *Attorney, Agent, or Firm* — Dinsmore & Shohl LLP

(57) ABSTRACT

Each of a monocoque body and a subframe is integrally formed of reinforced resin. The subframe has a bottom portion and an upstanding portion. The bottom portion is fixed to the lower portion of the rear wall of the monocoque body and extends rearward of the vehicle. The upstanding portion extends upward from the bottom portion. An engine is directly mounted on the rear surface of the upstanding portion.

3 Claims, 5 Drawing Sheets

MONOCOQUE VEHICLE STRUCTURE

CROSS REFERENCE TO RELATED APPLICATION

This application claims priority to Japanese Patent Application No. 2019-017221 filed on Feb. 1, 2019, which is incorporated herein by reference in its entirety including the specification, claims, drawings, and abstract.

TECHNICAL FIELD

The present disclosure relates to a monocoque vehicle structure equipped with a monocoque body made of reinforced resin.

BACKGROUND

Some vehicles include a body having a monocoque structure; that is, a body functioning also as a structural member. Some monocoque vehicles may have a metal body, while others may have an integral resin body, or a monocoque body. JP 2004-262443A describes a vehicle equipped with a monocoque body that is integrally formed of reinforced resin that contains carbon fibers as reinforcement. In a monocoque vehicle having a monocoque body, for example, a rear frame is fixed to the rear portion of the monocoque body with bolts, and an engine is rubber-mounted on the rear frame.

Another known method for mounting an engine is to mount an engine directly on a vehicle, or stress mount.

SUMMARY

Rubber mount is a method for mounting an engine, the method being superior in damping of vibration of an engine. Specifically, an engine is mounted via a rubber member disposed so as to surround the barycenter of the engine. This manner of mounting requires a large-scale rear frame that is large enough for rubber-mount of an engine, which increases the mass of the vehicle. In addition, separate formation of the monocoque body and the rear frame and fastening these with bolts lead to a decrease in torsional rigidity in an area near the fastened portion.

To address the above, assume that an engine is directly mounted on the monocoque body, without using a rear frame. In this case, the reinforced resin may be deteriorated due to heat transmitted from the engine, although a decrease in torsional rigidity can be avoided. In view of the above, use of a highly thermal resistant resin is a possibility. The use, however, may raise concern, for example, if the strength of the highly thermal resistant resin is relatively low, that a large molded monocoque body might be cracked when being demolded.

The present disclosure aims to reduce or prevent an increase in weight of a vehicle and a decrease in torsional rigidity in mounting an engine in a vehicle equipped with a monocoque body made of reinforced resin.

According to one aspect of this disclosure, there is provided a monocoque vehicle including a monocoque body integrally formed of reinforced resin; a subframe integrally formed of reinforced resin, the subframe including a bottom portion and an upstanding portion extending upward from the bottom portion, the bottom portion being fixed to the lower portion of the rear wall of the monocoque body, the bottom portion extending rearward of the vehicle; and an engine directly mounted on the rear surface of the upstanding portion of the subframe.

In one embodiment, the rear wall of the monocoque body may have a projecting portion attached to the upper portion of the rear wall, the projecting portion extending rearward, and the upper portion of the upstanding portion may be fixed to the projecting portion.

In one embodiment, the reinforced resin that forms the subframe may be a thermal resistant resin that is resistant at a higher temperature than a temperature at which the reinforced resin that forms the monocoque body is resistant.

According to the present disclosure, use of a relatively small subframe enables reduction or prevention of an increase in weight of a vehicle, and the rear wall of the monocoque body and the upstanding portion of the subframe enable reduction or prevention of a decrease in torsional rigidity.

BRIEF DESCRIPTION OF DRAWINGS

Embodiment(s) of the present disclosure will be described based on the following figures, wherein.

DESCRIPTION OF EMBODIMENTS

Embodiments will now be described with reference to the accompanying drawings. To facilitate understanding of the present disclosure, concrete embodiments will be described, although these embodiments are only examples, and any other embodiments are feasible.

Figure 1:
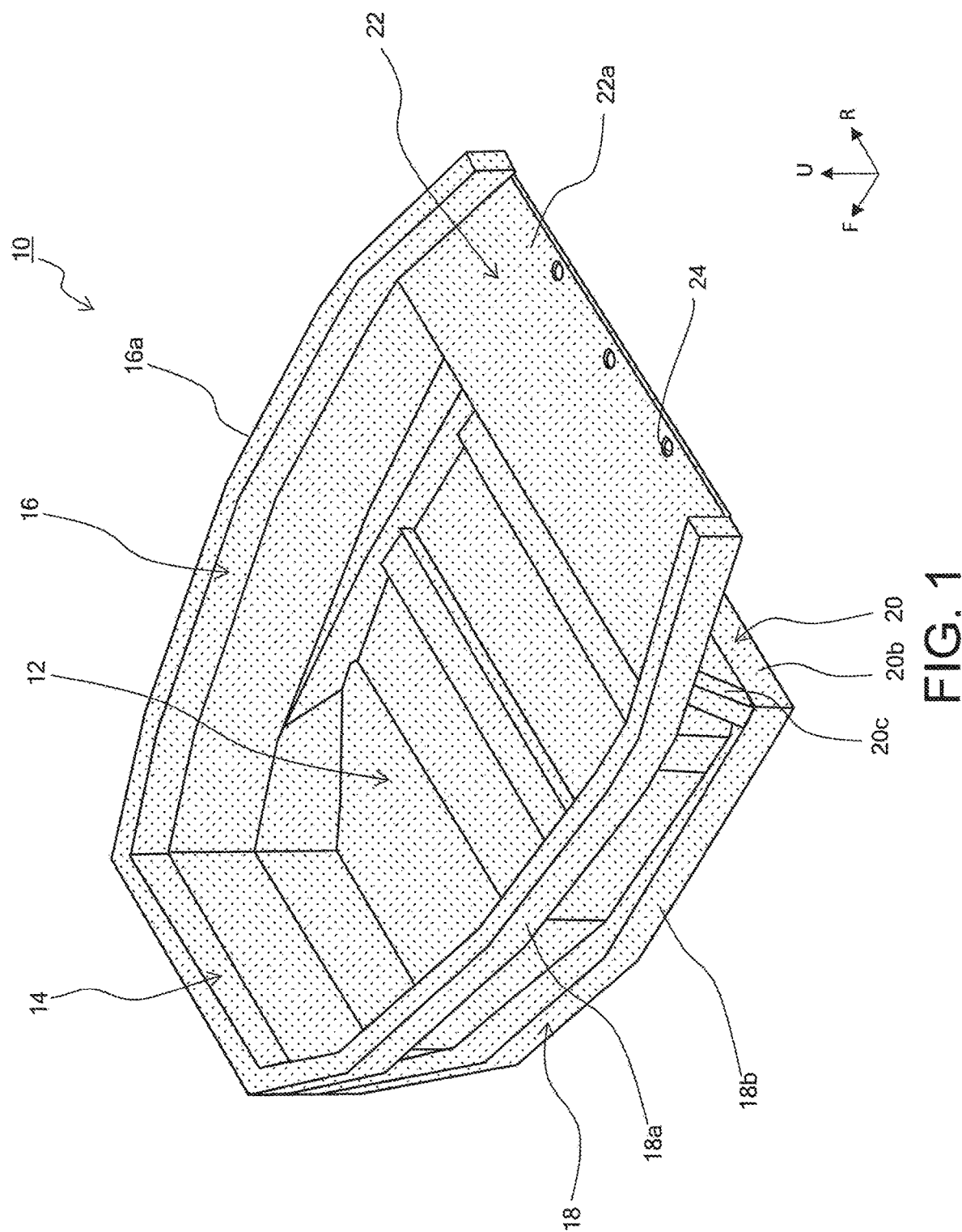
FIG. 1 is a schematic perspective view of a monocoque body according to an embodiment.

FIG. 1 is a schematic perspective view of a monocoque body 10 of a monocoque vehicle according to an embodiment, viewed from the left rear. The F axis in the coordinate system in the drawing indicates the forward direction of the vehicle; the U axis indicates the upper direction; the R axis indicates the rightward direction from an occupant (similarly applicable to other drawings).

In a monocoque vehicle according to an embodiment, the monocoque body 10 bears active functions for ensuring rigidity and for transmitting a load in and around the middle of the vehicle by utilizing its entire shape. In other words, the monocoque body 10 of a monocoque vehicle functions as a structural member, with no frame structure, such as a ladder frame, provided beneath the monocoque body 10.

The monocoque body 10 includes an under wall 12, a front wall 14, a right wall 16, a left wall 18, and a rear wall 20. The under wall 12 spreads substantially horizontally, and is surrounded by the other walls 14, 16, 18, 20, which extend substantially vertically. The rear wall 20 has a projecting portion 22 attached to the upper portion of the rear wall 20, the projecting portion 22 extending rearward of the vehicle. The projecting portion 22 has three bolt holes 24 formed near its rear end.

The monocoque body 10 is integrally formed of reinforced resin. Reinforced resin refers to resin whose strength is enhanced with reinforcement. Examples of reinforcements include carbon fibers and glass fibers. Examples of resins include thermosetting resins. The monocoque body 10 is molded, for example, through Resin Transfer Molding, or RTM. In the RTM process, for example, carbon fibers or glass fibers are processed into a shape similar to the final shape of the monocoque body 10 to thereby produce a fiber pre-form; the fiber pre-form is put in a mold; a melted resin is poured into the mold so that the fiber pre-form soaks in the resin; and the resin is cured and then demolded. With the above, an integral seamless monocoque body 10 can be obtained.

In principle, the monocoque body 10 has reinforcement over its entire body to enhance the resin. Further, the overall strength is enhanced with a thicker portion, or a "skeleton portion", that is formed partially on the body by concentrating a significant amount of reinforcement and resin. For example, a skeleton portion 16a is formed on the upper portion of the right wall 16, and a skeleton portion 18a is formed on the upper portion of the left wall 18. The skeleton portions 16a, 18a reinforce the upper portion of the monocoque body 10 to improve the rigidity of the portion. Of the skeleton portions, the skeleton portions 16a, 18a are formed extending rearward beyond the rear wall 20 to thereby constitute the respective lateral portions of the projecting portion 22 in the vehicle width direction, and reinforce the strength of a thin panel portion 22a corresponding to the middle of the projecting portion 22 to thereby enhance the overall rigidity of the projecting portion 22. Further, a skeleton portion 18b is formed on a lower portion of the left wall 18, and a skeleton portion 20b is formed on the lower portion of the rear wall 20. The skeleton portions 18b, 20b reinforce the lower portion of the monocoque body 10 to enhance the rigidity of the portion. Further, a skeleton portion 20c is formed on each of the lateral sides of the rear wall 20 in the vehicle width direction to connect the upper portion and the lower portion of the monocoque body 10 to thereby enhance the rigidity in an area near the rear wall 20.

Figure 2:
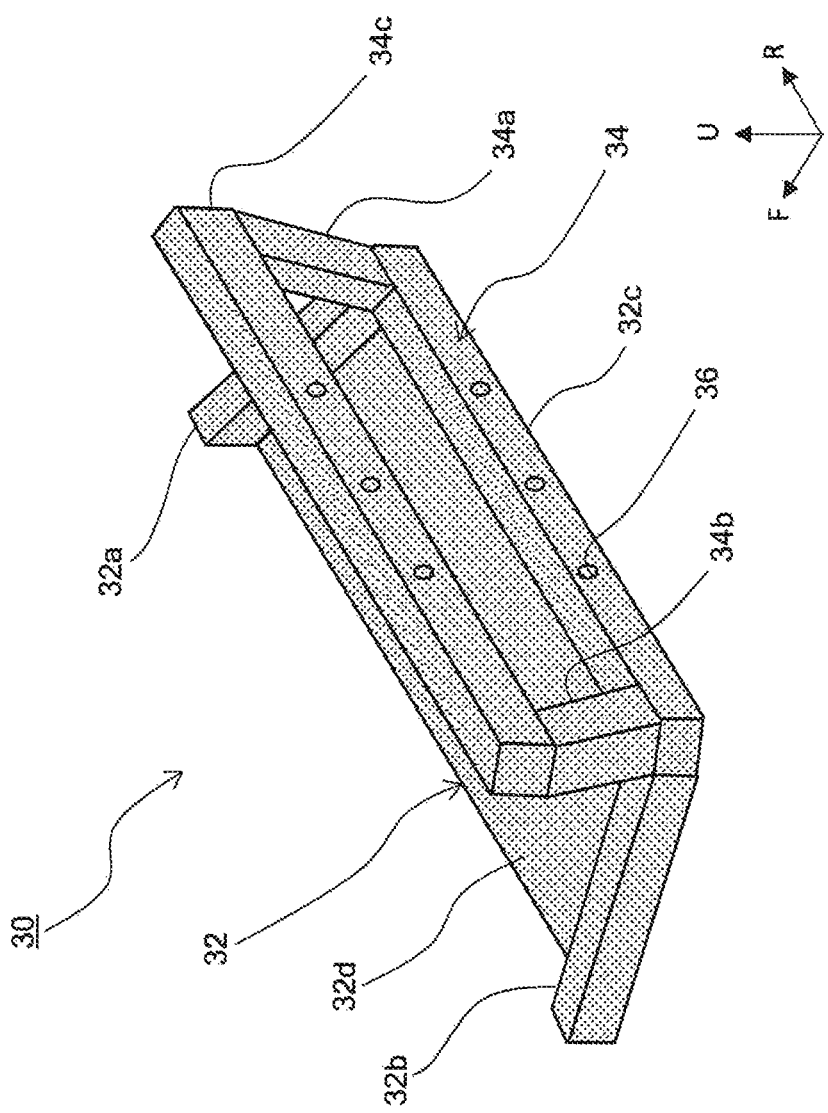
FIG. 2 is a schematic perspective view of a subframe according to an embodiment.

FIG. 2 is a schematic perspective view of a subframe 30 disposed behind the monocoque body 10. The subframe 30 is a frame fixed to the monocoque body 10 to assist the monocoque body 10. The subframe 30 is small in dimension, compared with the monocoque body 10. Similar to the monocoque body 10, the subframe 30 is integrally formed of reinforced resin and functions also as a structural member for transmitting a load acting on the vehicle. For the subframe 30, a highly thermal resistant resin (that is, a kind of resin that begins deterioration at a relatively higher temperature), compared with the resin for the monocoque body 10, is used, as an engine is directly mounted on the subframe 30, as to be described later.

The subframe 30 has a shape including a bottom portion 32 and an upstanding portion 34. The bottom portion 32 includes skeleton portions 32a, 32b formed on the respective lateral sides of the subframe 30 in the vehicle width direction, a skeleton portion 32c formed on the rear end of the subframe 30, and a thin panel portion 32d surrounded by these skeleton portions 32a, 32b, 32c. The upstanding portion 34 includes the skeleton portion 32c, and skeleton portions 34a, 34b, 34c. The skeleton portions 34a, 34b extend upward from the respective lateral sides of the skeleton portion 32c (which is also a part of the bottom portion 32) in the vehicle width direction. The skeleton portion 34c connects the upper portions of the skeleton portions 34a, 34b. The skeleton portions 32c, 34a, 34b, 34c together define a space. The space, surrounded by the skeleton portions 32c, 34a, 34b, 34c, is left open with no member disposed therein. Bolt holes 36 are formed on the rear surfaces of the skeleton portions 32c, 34c to be used in fixing an engine through direct mount (stress mount).

Figure 3:
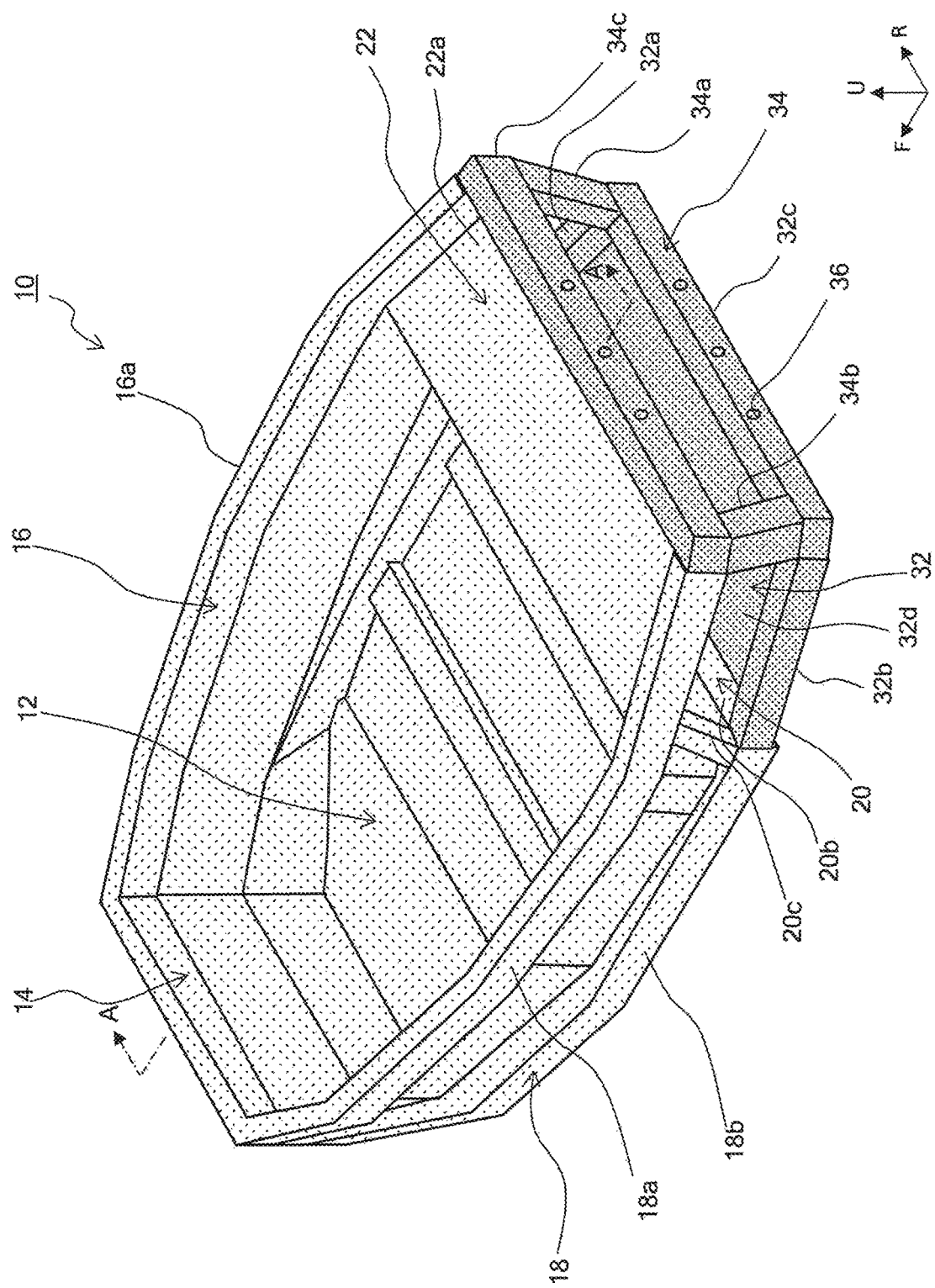
FIG. 3 is a perspective view of a monocoque body and a subframe fixed to the monocoque body.

FIG. 3 is a perspective view of the monocoque body 10 and the subframe 30 fixed to the monocoque body 10. That is, the bottom portion 32 of the subframe 30 is fixed to the skeleton portion 20c of the rear wall 20 of the monocoque body 10. The fixing is achieved by fastening the skeleton portions 32a, 32b and thin panel portion 32d of the bottom portion 32 to the skeleton portion 20c of the monocoque body with bolts, for example. Further, the upstanding portion 34 of the subframe 30 is fixed to the projecting portion 22 of the monocoque body 10. This fixing is achieved by fastening the skeleton portion 34c of the upstanding portion 34 to the skeleton portions 16a, 18a and the thin panel portion 22a of the projecting portion 22 with bolts, for example.

As described above, the respective end portions of the subframe 30; namely, the front end portions of the bottom portion 32 of the subframe 30 and the upper end portion of the upstanding portion 34, are fastened to the monocoque body 10 with bolts. This manner of fixing enhances the stability of the subframe 30, as compared with a case in which the subframe 30 is fixed to the monocoque body 10 in a manner like a cantilever, for example, and enables smooth transmission of a load acting on the subframe 30 to the monocoque body 10 through the respective end portions of the subframe 30.

For example, a large load that is to act rearward on the skeleton portions 16a, 18a of the monocoque body 10 at a frontal collision of a vehicle, for example, will be transmitted to the skeleton portion 34c of the subframe 30. Similarly, a large load that is to act rearward on the skeleton portion 18b of the monocoque body 10 at a frontal collision will be transmitted to the skeleton portions 32a, 32b of the subframe 30 through the skeleton portion 20b. With these transmissions, large load-resistive capability can be achieved as a whole.

Figure 4:
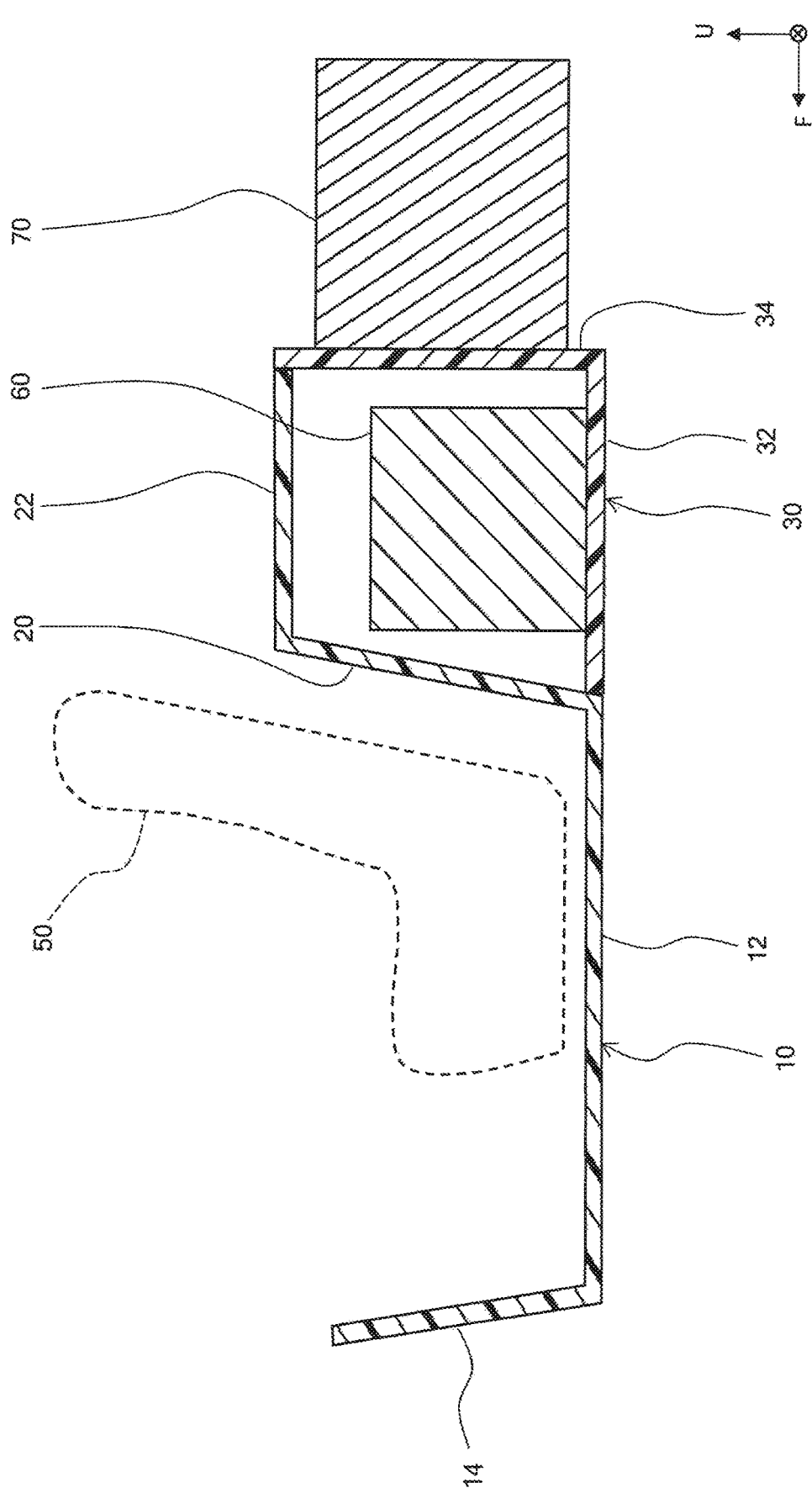
FIG. 4 is a schematic end view of a monocoque vehicle along a plane AA in FIG. 3.

The entire structure of a vehicle will now be described while referring to FIG. 4 as well. FIG. 4 is a schematic end view (a cross sectional view with no background illustrated) of a monocoque vehicle on the plane AA (a vertical surface passing through the center of the vehicle in the width direction) in FIG. 3. In FIG. 4, for brevity of description, the thicker portions of the monocoque body 10 and the subframe 30 are illustrated as having a constant thickness, and the shapes of the monocoque body 10 and the subframe 30 are slightly different from those in other drawings.

As illustrated in FIG. 4, the monocoque body 10 is formed having a vessel-like shape that is open upward and defined by the under wall 12, the front wall 14 at the front of the monocoque body 10, and the rear wall 20 at the rear of the monocoque body 10. The projecting portion 22, extending rearward of the vehicle, is attached to the upper end of the rear surface of the rear wall 20 of the monocoque body 10. Note that the projecting portion 22 may be attached at any position on the upper portion of the rear wall 20 (any position on a relatively upper portion of the rear wall 20), for example, a position on the rear wall 20 slightly lower than the upper end of the rear wall 20 or a position on the upper surface of the upper end of the rear wall 20.

Inside the vessel of the monocoque body 10, for example, a seat 50 is mounted. As the vehicle in this embodiment is assumed to be a two-seater racing car, two seats 50 are mounted side by side in the vehicle width direction. The seat 50, which is not on the plane AA, is indicated by a broken line. Needless to say that this embodiment is applicable to general vehicles for running on public roads, not being limited to racing cars for running on racing circuits.

The subframe 30 is disposed behind the monocoque body 10. "Behind the monocoque body 10" here refers to a more rearward side of the vehicle than at least a part of the rear surface of the monocoque body 10. Although the rear surface of the monocoque body 10 is composed of the rear wall 20 and the projecting portion 22 and the rear end portion of the projecting portion 22 is positioned more rearward than the bottom portion 32 of the subframe 30, it can be said that the subframe 30 is positioned behind the monocoque body 10, as the subframe 30 is disposed basically more rearward than the rear wall 20.

The subframe 30 includes the bottom portion 32 and the upstanding portion 34. The bottom portion 32 is fixed to the lower end of the rear surface of the rear wall 20 of the monocoque body 10 and extends rearward therefrom. Note that the bottom portion 32 may be fixed to any position on a lower portion of the rear wall 20 (any position on a relatively lower portion of the rear wall 20), for example, a position on the rear wall 20 slightly higher than the lower end of the rear surface of the rear wall 20 or a position on the lower surface of the lower end of the rear wall 20. The upstanding portion 34 extends substantially vertically upward from an area near the rear end of the bottom portion 32.

Note that the bottom portion 32 is so named because the bottom portion 32 is disposed in a lower position of the vehicle relative to the upstanding portion 34. The subframe 30 may have a portion positioned lower than the bottom portion 32 in the vehicle. The bottom portion 32, which is shaped flat in this embodiment, may be shaped corrugated or stepped, for example, or inclined upward or downward as it goes rearward. The bottom portion 32 may include an open space with no reinforced resin disposed therein.

The middle portion of the upstanding portion 34 makes an open space with no reinforced resin disposed therein, as illustrated in FIG. 3, although that shape of the upstanding portion 34 is not illustrated in FIG. 4. Needless to say that the middle portion of the upstanding portion 34 may be solid with reinforced resin, as illustrated in FIG. 4. The upstanding portion 34, having a flat shape extending substantially vertically in this embodiment, may have a corrugated or stepped shape, for example, or a shape that is inclined forward or rearward as it goes upward, for example.

As illustrated in FIG. 4, the bottom portion 32 and upstanding portion 34 of the subframe 30 and the rear wall 20 and projecting portion 22 of the monocoque body 10 together define a closed cross section. The bottom portion 32 and the projecting portion 22 both extend in the front-rear direction of the vehicle, thereby constituting two load transmission paths for transmitting a load inputted in the front-rear direction of the vehicle to thereby enhance the strength of the vehicle. Meanwhile, the upstanding portion 34 and the rear wall 20 both extend in the up-down and width directions of the vehicle, so that these two portions enhance the torsional rigidity of the vehicle (rigidity against deformation of twisting a vehicle).

A battery 60, for example, is mounted on the upper surface of the bottom portion 32 of the subframe 30. The respective lateral sides of the battery 60 in the vehicle width direction are left open with no member disposed on the lateral surfaces of the subframe 30 in the vehicle width direction, as illustrated in FIG. 2 and FIG. 3. This structure facilitates exchange of batteries 60. If a separate path for exchange of batteries 60 is available, the subframe 30 can be formed so as to have walls that entirely or partially block the lateral sides of the subframe 30.

In addition, an engine 70 is directly mounted on the rear surface (a surface facing rearward of the vehicle) of the upstanding portion 34 of the subframe 30 with bolts, not illustrated. Direct mount refers to, for example, a condition in which the engine 70 is directly connected to the subframe 30, rather than being rubber-mounted with an intervening rubber, or a vibration damping member, for example. Direct mount may also be referred to as stress mount. As an engine is made of metal to be rigid, the rigid engine, when being directly mounted on the subframe 30, can reinforce the rigidity of the subframe 30, whereby the overall rigidity in this area is enhanced. In addition, the engine 70 functions also as a structural member that connects the subframe 30 and the rear portion of the vehicle. For example, a load inputted from the subframe 30 at a fontal collision is transmitted rearward via the engine 70 beyond the engine 70. In contrast, if the engine 70 is rubber-mounted on the upstanding portion 34, the engine 70 will be displaced relative to the subframe 30 by an amount corresponding to elastic deformation of the rubber, and thus cannot reinforce the rigidity of the subframe 30.

The engine 70 is fixed to the subframe 30 only via the rear surface of the upstanding portion 34 of the subframe 30. With this manner of fixing, the subframe 30 is formed very small, for example, compared with a frame that supports the engine 70 on the lower surface of the engine 70. The small subframe 30 enables reduction or prevention of an increase in weight of the vehicle.

The engine 70 becomes hot as fuel, such as gasoline, is burnt, and the heat will be transmitted to the subframe 30, which is directly connected to the engine 70. In view of this, a highly thermal resistant reinforced resin is used for the subframe 30, compared with the resin for the monocoque body 10. Meanwhile, as the monocoque body 10 does not require such a highly thermal resistant resin, resin for the monocoque body 10 is selected from the viewpoint of, for example, whether the resin is readily usable for a large scale molding without concern for fragility although its thermal resistance may be relatively low. Note that the heat from the engine 70 will be transmitted to its surrounding area through convection and radiation. A thermal increase in members around the engine 70 due to the heat transmission, however, is normally small, compared with that in the subframe 30 directly connected to the engine 70, and thermal resistance is not a critical concern.

Here, for example, a metal front frame, not illustrated, is disposed ahead of the monocoque body 10 and fixed to the monocoque body 10, and the axle of the front wheels, for example, is mounted on the front frame. In addition, for example, a gear box is directly mounted on the engine 70, and the axel of the rear wheels, for example, is mounted on the gear box. That is, the vehicle in this embodiment is a rear-engine rear-drive (RR) vehicle with the engine 70 mounted in the rear portion of the vehicle to drive the rear wheels. Further, a front glass is mounted on the upper front portion of the monocoque body 10, and a roof is mounted on the upper portion of the monocoque body 10.

Figure 5:
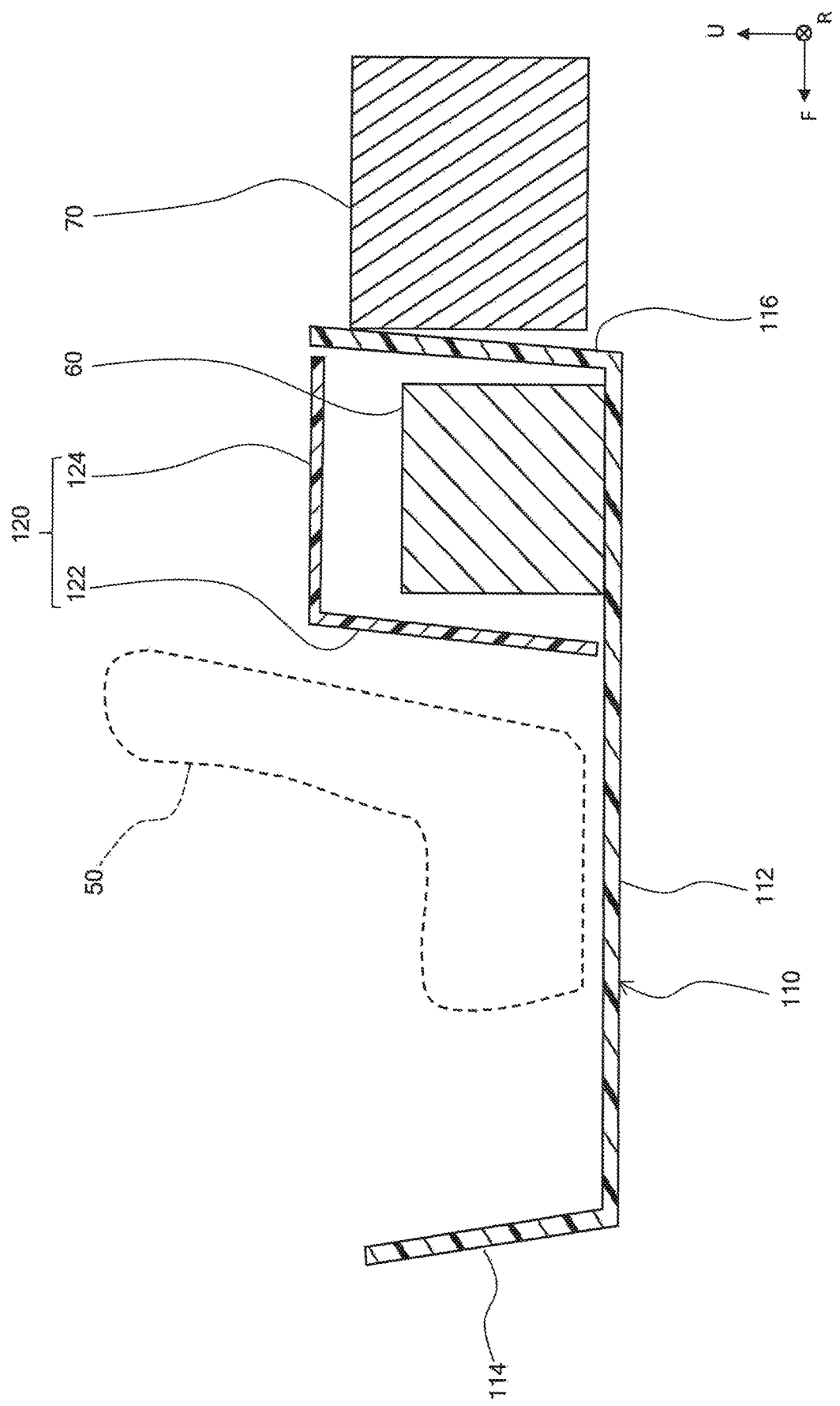
FIG. 5 is an end view of a monocoque vehicle according to a reference embodiment.

A reference embodiment will now be described by reference to FIG. 5. FIG. 5 is an end view of a monocoque vehicle according to a reference embodiment, corresponding to FIG. 4. The monocoque body 110 of this vehicle is similar to the monocoque body 10 in FIG. 4 in that the monocoque body 110 has a vessel-like shape that is open upward and defined by a front wall 114 at the front of an under wall 112 and a rear wall 116 at the rear of the under wall 112, and that the seat 50 is mounted inside the monocoque body 110. The difference is that the under wall 112 of the monocoque body 110 extends longer rearward of the vehicle, and that the rear wall 116 is disposed at a relative rear position of the vehicle. The position of the rear wall 116 is substantially the same as that of the upstanding portion 34 of the subframe 30 illustrated in FIG. 4. The monocoque body 110 does not have the projecting portion 22 illustrated in FIG. 4.

In the reference embodiment in FIG. 5, the subframe 30 is not mounted. The battery 60 is mounted on the rear portion of the under wall 112 of the monocoque body 110. The position where the battery 60 is mounted is the same as that in the embodiment in FIG. 4. In the reference embodiment, the battery 60 is covered by an interior trim 120 made of resin or reinforced resin. The interior trim 120 has an L-shaped cross section including a front wall 122 and an upper wall 124. The front wall 122 covers the front surface of the battery 60, and the upper wall 124 covers the upper surface of the battery 60. The interior trim 120 is removably attached to the monocoque body 110 so as to allow exchange of batteries. Thus, the interior trim 120 does not bear the function of load transmission in the vehicle. In the reference embodiment, only the monocoque body 110 bears the functions of transmitting a load and ensuring rigidity in this area.

In the reference embodiment, the engine 70 is directly mounted on the rear wall 116 of the monocoque body 110 with bolts, for example. That is, the engine 70 is directly connected to the monocoque body 110 without intervention of the subframe 30, unlike the embodiment illustrated in FIG. 4. This structure allows the rigid engine 70 to directly reinforce the rigidity of the monocoque body 110. Further, the absence of the subframe 30 enables reduction in the number of fastening points.

In the reference embodiment, however, heat from the engine 70 is directly transmitted to the rear wall 116 of the monocoque body 110. To protect the monocoque body 110 from the heat, for example, use of a highly thermal resistant resin as reinforced resin for the monocoque body 110 is a possibility. In general, however, as the strength of a highly thermal resistant resin is relatively low, there is concern, when molding the resin to produce a large member, such as the monocoque body 110, that a molded resin might be broken when being demolded.

Moreover, in molding with different kinds of resins, the strength of a part of a molded product along a boundary between different kinds of resins is generally lower. Thus, integral formation of the monocoque body 110 such that a highly thermal resistant resin is used only in an area near the rear wall 116 is not possible.

Separate molding of only the rear wall 116 from the other portion of the monocoque body 110 is another possibility. This manner of molding, however, requires fastening between the rear wall 116 and the remaining portion of the monocoque body 110 with bolts, for example, which results in low rigidity, as compared with the case of integral molding.

In contrast, in this embodiment, use of the subframe 30 made of a highly thermal resistant resin enables addressing the problem of heat from the engine 70. Further, the closed cross section defined by the subframe 30 and the monocoque body 10 enables reduction or prevention of decrease in rigidity or enables enhancement of rigidity. In this embodiment, in particular, the rear wall 20 of the monocoque body 10 and the upstanding portion 34 of the subframe 30 enables enhancement of torsional rigidity.

In the above description, the monocoque body 10 in this embodiment has the projecting portion 22 attached to the upper portion of the rear wall 20, and the subframe 30 has the bottom portion 32 disposed at a lower position in the subframe 30. Instead of this structure, the projecting portion 22 may be formed on the lower portion of the rear wall 20 of the monocoque body 10, and a wall for connection to the rear wall 20 may be formed on the upper portion of the upstanding portion 34 of the subframe 30. In this case, however, the resultant monocoque body 10 has complicated projections and recesses, which makes it difficult to form the monocoque body 10 through molding. In contrast, the monocoque body 10 in this embodiment can be readily molded using an upper mold and a lower mold.

The invention claimed is:

1. A monocoque vehicle comprising:
   a monocoque body integrally formed of reinforced resin;
   a subframe integrally formed of reinforced resin, the subframe including a bottom portion and an upstanding portion extending upward from the bottom portion, the bottom portion being fixed to a lower portion of a rear wall of the monocoque body, the bottom portion extending rearward of a vehicle; and
   an engine directly mounted on a rear surface of the upstanding portion of the subframe.

2. The monocoque vehicle structure according to claim 1, wherein
   the rear wall of the monocoque body has a projecting portion attached to an upper portion of the rear wall, the projecting portion extending rearward, and
   an upper portion of the upstanding portion is fixed to the projecting portion.

3. The monocoque vehicle structure according to claim 1, wherein
   the reinforced resin that forms the subframe is a thermal resistant resin that is resistant at a higher temperature than a temperature at which the reinforced resin that forms the monocoque body is resistant.

* * * * *